United States Patent Office 2,843,570
Patented July 15, 1958

2,843,570
ALKYL AND ARYL ISOPROPENYL SULFONES AND POLYMERS THEREOF

Harry W. Coover, Jr., and Hubert M. Hill, Kingsport, Tenn., assignors to Eastman Kodak Company, Rochester, N. Y., a corporation of New Jersey No Drawing. Application August 31, 1953
Serial No. 377,719

7 Claims. (Cl. 260—79.3)

This invention relates to isopropenyl sulfones which are substituted in the sulfone group with an alkyl or an aryl group, to polymers and copolymers thereof, and to methods for preparing the same.

These isopropenyl sulfones are new compounds not previously known to the art although vinyl sulfones are, of course, well known. The vinyl sulfones are known to exhibit low molecular weight when polymerized and their polymers are brittle when spun into filaments, cast into sheets or extruded into film; whereas the compounds of our invention when homopolymerized or copolymerized with certain unsaturated aliphatic compounds produce polymeric products that exhibit greatly improved polymer properties as will be illustrated hereinafter.

This invention has as an object the provision of a new and valuable class of monomeric as well as polymeric materials. A further object is to provide interpolymers of these sulfones with certain unsaturated aliphatic compounds, e. g. vinyl or vinylidene compounds including butadiene. A still further object is to provide polymers of value in coating compositions. Still another object is to provide polymers of value in plastics such as molding compositions. Another object is to provide polymers suitable for use in formation of fibers, sheets, and films. Additional objects will become apparent from examination of the following description and claims.

According to one aspect of our invention, new isopropenyl sulfone compounds are provided which can be represented by the following general formula:

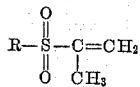

wherein R represents an alkyl group containing from one to six carbon atoms or an aryl group of the benzene series, e. g., phenyl, tolyl, etc.

The isopropenyl sulfone monomers which can be used in accordance with this invention can advantageously be prepared by first reacting sodium mercaptide with β-chloropropyl alkanoate to form the β-alkylmercaptopropyl alkanoate. This β-alkylmercaptopropyl alkanoate can then be oxidized to form an acyloxy isopropyl sulfone which in turn can be pyrolyzed to form the desired isopropenyl sulfone. The following series of reactions illustrate the formation of the isopropenyl sulfone monomers:

(A)
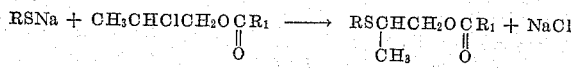

(B)
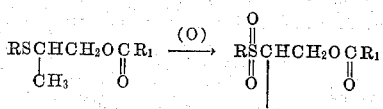

(C)
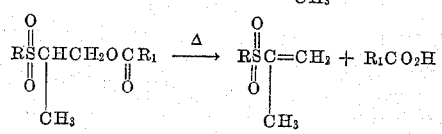

wherein R represents an alkyl group containing from one to six carbon atoms or an aryl group of the benzene series, e. g., phenyl, tolyl, etc., and wherein $R_1$ represents an alkyl group containing from one to four carbon atoms.

It is of course to be understood that the above series of reactions for the preparation of isopropenyl sulfones is merely illustrative of one of the methods by which these compounds can be prepared.

The polymerization of these new alkyl or aryl isopropenyl sulfones alone or conjointly with one or more other ethylenically unsaturated compounds can be advantageously accomplished by the usual polymerization methods known to the art using a typical polymerization catalyst. Exemplary of such catalysts are the organic acid peroxides (e. g., acetyl, propionyl, benzoyl, acetyl benzoyl, etc. peroxides); the alkali metal persulfates (e. g., sodium potassium, etc., persulfates); ammonium persulfate; hydrogen peroxide; t-butyl peroxide; the alkali metal perborates, e. g. sodium perborate, etc.; the azo compounds (e. g. methyl azo-bis-isobutyrate, azo-bis-isobutylnitrile, etc.); etc. These catalysts can be called peroxy or azo type catalysts.

The process of polymerization can be effected in mass or in the presence of an inert diluent (e. g. water, acetic acid, 1,4-dioxane, acetonitrile, etc.). However, the monomers can also be emulsified in a liquid in which they are insoluble (e. g. in water) and the emulsion then subjected to polymerization. The monomers can also be suspended in water using a relatively poor dispersing agent (e. g. starch) and polymerized in granular form. The monomers can also be polymerized as above described with one or more copolymerizable ethylenically unsaturated organic compounds, for example, with vinylidene compounds (i. e. compounds containing the basic >C=C< group which is intended to include derivatives of ethylene, butadiene, etc.), e. g. vinyl acetate, vinyl propionate, vinyl butyrate, vinyl trifluoroacetate, methyl acrylate, methyl methacrylate, styrene, ortho-acetamino styrene, α-methylstyrene, 2,4-dichloro-α-methylstyrene, acrylonitrile, α - methacrylonitrile, α - acetoxy - acrylonitrile, vinyl chloride, vinyl fluoride, vinylidene dichloride, vinylidene chloride-fluoride, vinyl methylketone, trifluoromethyl vinylketone, vinylmethylether, vinyl-ω-trifluoroethyl ether, vinylmethyl sulfone, vinyl sulfonamide, trans-β-cyano- and carboxamidomethyl acrylate, vinylmethylurethane, acrylamide, acrylic acid ethylamide, vinyl phthalimide, vinyl succinimide, acrylic acid, vinyl naphthalene, isobutylene, ethylene, butadiene, α-acetoxy-butadiene-1,3, maleic anhydride, methyl maleate, methyl fumarate, methyl cyanoacrylate, vinylidene cyanide, vinylidene fluoride, 1,1-difluoro - 2,2 - dichloroethylene, tetrafluoroethylene, etc.

The copolymers of the invention may contain variable amounts of each comonomer and are obtained with starting polymerization mixtures having 5 to 95 molecular proportions of the isopropenyl sulfones and from 95 to 5 molecular proportions of the above-mentioned ethylenically unsaturated organic compounds. However, the preferred copolymers made in accordance with our invention contain 10 to 90 molecular proportions of the new isopropenyl sulfones and from 90 to 10 molecular proportions of the other unsaturated co-monomers. The temperature of polymerization at normal pressures can be varied from 0° C. to 120° C., preferably from 30° C. to 75° C. When the polymerization is carried out in an inert solvent medium such as previously mentioned, the concentration of the monomers to be polymerized can advantageously be varied so as to be from 1 to 25 percent by weight based on the weight of the solvent employed. Certain so-called activating agents can advantageously be used in conjunction with the peroxy or azo polymerization catalyst, if desired. Such agents include, for example, sodium bisulfite, ferrous sulfate, etc. Chain length regulators, e. g. dodecyl mercaptan, etc., can also be advantageously used, if desired.

The following examples will serve to further illustrate our invention:

*Example 1.—Preparation of alkyl isopropenyl sulfones*

(A) One gram mole of sodium was dissolved in 500 ml. of ethanol and 1.1 gram moles of methyl mercaptan was added to the solution which was then refluxed for one hour. This solution was then added to a refluxing solution of 1 gram mole of 2-chloropropyl acetate in 200 ml. of ethanol. As soon as the addition was complete the mixture was cooled and filtered. The ethanol was removed under vacuum and the residue was filtered. See reaction A above.

(B) The residue from A was heated on a steam bath with 75 g. of acetic anhydride and 1 gram of sodium acetate for two hours. After removing the solvent under vacuum, the residue was dissolved in 150 ml. of acetic acid and 175 grams of 30% $H_2O_2$ were added at a gentle reflux. After heating for a further three hours on a steam bath, the solvents were removed under vacuum. See reaction B above.

(C) The material from B was pyrolyzed by passing it through a Pyrex tube at 350° C. with a contact time of 2.8 seconds. Distillation of the reaction products gave 65 grams of methyl isopropenyl sulfone, B. P. 100–105° C./.5 mm. See reaction C above.

In like manner isobutyl isopropenyl sulfone was prepared by using 1.1 gram moles of isobutyl mercaptan in place of methyl mercaptan. This resulted in the formation of 87 g. of isobutyl isopropenyl sulfone, B. P. 148° C./5 mm. Similarly, n-butyl isopropenyl sulfone was prepared by using 1.1 gram moles of n-butyl mercaptan in place of methyl mercaptan. This resulted in the formation of 86 g. of butyl isopropenyl sulfone, B. P. 155° C./.5 mm.

*Example 2.—Preparation of aryl isopropenyl sulfones*

(A) One gram mole of sodium was dissolved in 500 ml. of ethanol and 1.1 gram moles of phenyl mercaptan was added to the solution which was then refluxed for one hour. This solution was then added to a refluxing solution of one gram mole of 2-chloropropyl acetate in 200 ml. of ethanol. As soon as the addition was complete the mixture was cooled and filtered. The ethanol was removed under vacuum and the residue was filtered again. See reaction A above.

(B) The residue from A was heated on a steam bath with 75 g. of acetic anhydride and 1 gram of sodium acetate for two hours. After removing the solvent under vacuum, the residue was dissolved in 150 ml. of acetic acid and 175 grams of 30% $H_2O_2$ was added at a gentle reflux. After heating for a further three hours on a steam bath, the solvents were removed under vacuum. See reaction B above.

(C) The material from B was pyrolyzed by passing it through a Pyrex tube at 350° C. with a contact time of 2.8 seconds. Distillation of the reaction products gave 75 grams of phenyl isopropenyl sulfone, B. P. 170–172° C./.5 mm. See reaction C above.

In like manner p-tolyl isopropenyl sulfone was prepared by using 1.1 gram moles of p-tolyl mercaptan in place of phenyl mercaptan. This resulted in the formation of 90 grams of p-tolyl isopropenyl sulfone, B. P. 177° C./.5 mm.

*Example 3.—Polymer of methyl isopropenyl sulfone*

Ten grams of methyl isopropenyl sulfone and 0.2 gram of benzoyl peroxide were mixed and heated in a sealed tube at 80° C. for 48 hours. The resulting product was a hard polymer which was readily soluble in dimethylformamide or dimethylacetamide. Fibers from these polymeric solutions were formed by forcing the solutions under pressure through a spinnerette into a coagulating bath. The fibers thus formed were stretched 200–800 percent to increase their strength.

*Example 4.—Polymer of ethyl isopropenyl sulfone*

Ten grams of ethyl isopropenyl sulfone and 0.2 gram of azo-bis-isobutyronitrile were mixed and heated in a sealed tube at 80° C. for 24 hours. The resulting product was a hard, clear, colorless polymer which was readily soluble in acetone. This product was extruded and also injection molded to form various shaped materials.

*Example 5.—Polymer of phenyl isopropenyl sulfone*

Ten grams of phenyl isopropenyl sulfone and 0.2 gram benzoyl peroxide were mixed and placed in a sealed tube and heated at 90° C. for 24 hours. The resulting product was a clear, hard polymer which was readily soluble in dimethylacetamide. This product was capable of being extruded or injection molded to form films, sheets, rods, tubes and other shaped objects.

*Example 6.—Copolymers of methyl isopropenyl sulfone and methyl acrylate*

Seven grams of methyl isopropenyl sulfone, three grams of methyl acrylate and 0.3 gram of benzoyl peroxide were mixed and placed in a sealed tube and heated at 80° C. for 24 hours. The resulting product was a clear, hard polymer that was readily soluble in acetone. This product was capable of being extruded or injection molded.

*Example 7.—Copolymers of styrene ethyl isopropenyl sulfone and α-methylstyrene*

Nine grams of styrene, one gram of ethyl isopropenyl sulfone, one gram of α-methylstyrene, and 0.3 gram benzoyl peroxide were mixed and placed in a sealed tube and heated at 90° C. for 24 hours. The resulting product was a clear, hard resin. This product was capable of being injection molded.

*Example 8.—Copolymers of isopropyl isopropenyl sulfone and acrylonitrile*

Three grams of isopropyl isopropenyl sulfone, seven grams of acrylonitrile, 0.2 gram of ammonium persulfate, and 0.2 gram of sodium bisulfite were added with agitation to 100 ml. of distilled water. Polymerization began immediately and was complete within eight hours. The polymer precipitated from the solution and was isolated by filtration, then washed and dried. The resulting polymer was readily soluble in such solvents as dimethylformamide and dimethylacetamide. Fibers from these polymeric solutions were formed by forcing the solutions under pressure through a spinnerette into a coagulating bath of the type used for acrylonitrile fibers. Fibers thus formed from this polymer had a softening point above 200° C.

*Example 9.—Copolymers of phenyl isopropenyl sulfone and acrylonitrile*

Two grams of phenyl isopropenyl sulfone, eight grams of acrylonitrile, 0.2 gram of ammonium persulfate, and 0.2 gram of sodium bisulfite were added with agitation to 100 ml. of distilled water. Polymerization began immediately and was complete within eight hours. The polymer precipitated from the solution and was isolated by filtration, then washed and dried. The resulting polymer was soluble in such solvents as dimethylformamide and dimethylacetamide. Fibers from these polymeric solutions were formed by forcing the solutions under pressure through a spinnerette into a coagulating bath of the same type as in Example 8. Fibers thus formed from this polymer had a softening point above 200° C.

*Example 10.—Copolymers of isopropyl isopropenyl sulfone and vinyl chloride*

One gram of isopropenyl sulfone, nine grams of vinyl chloride, 0.2 gram of ammonium persulfate, one gram of potassium laurate, 0.2 gram of sodium bisulfite, and 100 ml. of distilled water were mixed and placed in a pressure bottle, i. e., a closed vessel. Polymerization began immediately and was complete within eight hours. The polymer was precipitated by the addition of a saturated sodium chloride solution and was isolated by filtration, then washed and dried. The resulting polymer was readily soluble in such solvents as dimethylformamide and dimethylacetamide. Fibers from these polymeric solutions were formed by forcing the solutions under pressure through a spinnerette into a coagulating bath. Fibers thus formed from this polymer had a softening point above 200° C. The product thus formed was capable of being extruded or injection molded.

*Example 11.—Copolymers of butyl isopropenyl sulfone and vinylidene chloride*

Eight grams of vinylidene chloride, 2 grams of butyl isopropenyl sulfone, 0.2 gram of ammonium persulfate, 0.2 gram of sodium bisulfite, and 2 grams of potassium laurate were added to 100 ml. of distilled water with agitation. Polymerization was effected by heating and stirring the mixture at 35° C. for eight hours. After the polymerization was complete a solution of sodium chloride was added to precipitate the polymer, which was then filtered, washed, and dried. The resulting polymer was soluble in dimethylacetamide and dimethylformamide. Fibers from these polymeric solutions were formed by forcing the polymeric solution under pressure through a spinnerette into a coagulating bath. The fibers thus formed had a softening point of about 170° C.

*Example 12.—Copolymers of methyl isopropenyl sulfone and butadiene*

Six grams of butadiene, two grams of methyl isopropenyl sulfone, 0.2 gram of ammonium persulfate, 0.2 gram of sodium bisulfite, and 2 grams of potassium laurate were placed in a pressure bottle and polymerization was effected by heating and tumbling at 40° C. for a period of 16 hours. The resulting polymeric emulsion was coagulated by the addition of a saturated aluminum sulfate solution. The resulting product was a soft rubbery material.

It is obvious that other equally valuable resinous copolymers of any of our new isopropenyl sulfones with other vinyl or vinylidene compounds, such as those mentioned above, can be prepared with facility by employing the general procedures of the foregoing illustrative examples.

The isopropenyl sulfones of our invention when homopolymerized or copolymerized with vinyl or vinylidene compounds form polymers of high molecular weight that can readily be spun into filaments, cast into sheets or extruded into film, all of which exhibit toughness, high tensile and impact strength, and other outstanding polymer properties not found in the vinyl sulfone polymers. The vinyl sulfone compounds when homopolymerized or copolymerized with vinyl or vinylidene compounds produce polymeric products which are relatively brittle. For example, when 10 g. of methyl vinyl sulfone and 0.2 g. of benzoyl peroxide were heated in a sealed tube at 80° C. for 48 hours, the resulting product was a hard, brittle polymer which was readily soluble in dimethylformamide or diethylacetamide. The fibers produced therefrom by forcing these polymeric solutions under pressure through a spinnerette into a coagulating bath were very brittle and were not susceptible to stretching.

The isopropenyl compounds of our invention are valuable as intermediates for the preparation of other useful organic compounds and when polymerized alone or conjointly with other ethylenically unsaturated organic compounds they form resinous polymers which are useful in the preparation of films, sheets, fibers and the like. The resinous polymers can also be molded and worked mechanically to finished form by the usual methods of milling, sawing, boring, etc.

We claim:

1. A polymer of a compound having the following formula:

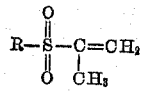

wherein R represents a substituent selected from the group consisting of an alkyl radical containing 1 to 6 carbon atoms and an aryl radical of the benzene series containing from 6 to 9 carbon atoms, which polymer is characterized by high molecular weight and can readily be spun into filaments which exhibit toughness, high tensile strength and high impact strength.

2. A copolymer of an isopropenyl compound having the general formula:

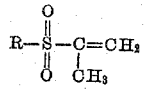

wherein R represents a substituent selected from the group consisting of an alkyl radical containing 1 to 6 carbon atoms and an aryl radical of the benzene series containing from 6 to 9 carbon atoms and a copolymerizable ethylenically unsaturated organic compound containing a >C=C< group, which copolymer is derived from 5 to 95 molecular proportions of the isopropenyl compound and from 95 to 5 molecular proportions of the copolymerizable compound and is characterized by high molecular weight.

3. A copolymer as defined by claim 2 wherein R is a methyl radical and said copolymerizable compound is acrylonitrile.

4. A copolymer as defined by claim 2 wherein R is an ethyl radical and said copolymerizable compound is α-methylstyrene.

5. A copolymer as defined by claim 2 wherein R is an isopropyl radical and said copolymerizable compound is vinyl chloride.

6. A copolymer as defined by claim 2 wherein R is a methyl radical and said copolymerizable compound is methyl acrylate.

7. A copolymer as defined by claim 2 wherein R is a methyl radical and said copolymerizable compound is butadiene.

References Cited in the file of this patent

UNITED STATES PATENTS

| | | |
|---|---|---|
| 2,474,808 | Schoene | July 5, 1949 |
| 2,505,366 | Schoene | Apr. 25, 1950 |
| 2,538,100 | Irany | Jan. 16, 1951 |

OTHER REFERENCES

Van Zuydewijn: Rec. trav. chim., 56, 1047–62, especially 1049, 1061, 1062 (1937). (Copy in Library.)

Backer et al.: Rec. trav. chim., 67, 884–893, especially 886 (1949). (Copy in Library.)